United States Patent [19]
Parton

[11] 3,883,523
[45] May 13, 1975

[54] TRIAZINE DERIVATIVES OF TRIPHENODIOXAZINES

[75] Inventor: Brian Parton, Manchester, England

[73] Assignee: Imperial Chemical Industries Limited, London, England

[22] Filed: Feb. 21, 1973

[21] Appl. No.: 334,287

Related U.S. Application Data

[63] Continuation-in-part of Ser. No. 137,706, April 26, 1971, abandoned.

[30] Foreign Application Priority Data

May 15, 1970 United Kingdom............... 23695/70

[52] U.S. Cl........ 260/246 R; 260/249.5; 260/249.8; 8/1 E; 8/54.2
[51] Int. Cl............................................ C09b 19/02
[58] Field of Search..................................... 260/246

[56] References Cited
UNITED STATES PATENTS 2,763,641  9/1956  Seitz et al............................ 260/246
2,954,378  9/1960  Pugin et al........................... 260/246

*Primary Examiner*—Harry I. Moatz
*Attorney, Agent, or Firm*—Cushman, Darby & Cushman

[57] ABSTRACT

Dyestuffs of the 2,9-diamino-6,13-dichlorotriphendioxazine series having from 1 to 4 sulphonic acid groups on the nucleus, and which are substituted on one or both of the amino groups by a chloro-, bromo- or sulpho-s-triazine reactive group, which may take the form —Tr — D — Tr where each Tr is a s-triazine nucleus of which at least one carries a Cl, Br or $SO_3H$ substituent and D is the residue of a diamine; the dyestuffs are cellulose-reactive dyes which provides bright reddish-blue to bright bluish-violet shades according to the extent to which the 2,9-amino groups are substituted.

2 Claims, No Drawings

TRIAZINE DERIVATIVES OF TRIPHENODIOXAZINES

This application is a continuation in part of application Ser. No. 137,706 filed Apr. 26, 1971, now abandoned.

This invention relates to new reactive dyestuffs and more particularly to new reactive dyestuffs of the triazine series having reddish-blue or bluish-violet shades.

A variety of chromophores have been utilized to manufacture reactive dyes of these shades. Thus, in general, bright reddish-blue shades having good resistance to a wide variety of fastness tests, especially washing and light, are obtained from the anthraquinone series and azo dyes, particularly copper complex monoazo and disazo dyes, give a further series of reddish blue dyes which usually are slightly duller and inferior in fastness to anthraquinone dyes. Anthraquinone dyes have, as a general criticism, an undesirably high cost of manufacture, and the proportion of dye fixing on the fibre is not as high as is desirable.

In seeking to overcome these deficiencies a class of dyestuffs has been found which provide blue or bluish violet shades, are inexpensive to manufacture and which, in the preferred members, have excellent fastness to light and to washing.

Thus according to one aspect of the invention there is provided a class of dyestuffs represented by the general formula:

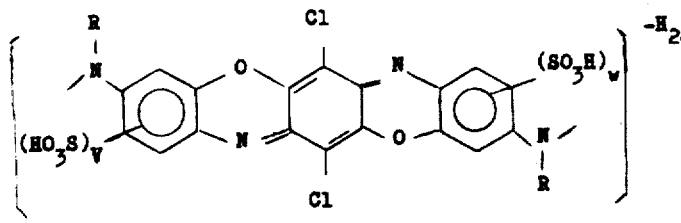

(1)

wherein V and w each have a value 0-2, and together have a value of at least 1, n has the value 1 to 2, the symbol A stands for Cl, Br, —OR$^1$, —NRR$^2$, —SR$^1$ or SO$_3$H and the symbol B stands for Cl, Br or a group of the formula:

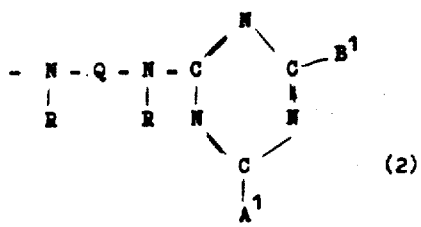

(2)

wherein Q represents an organic linking group, A$^1$ and B$^1$ independently represent Cl, Br, SO$_3$H, —OR$^1$, —NRR$^1$ or —SR$^1$, provided that at least one of A, A$^1$ and B$^1$ represents Cl, Br or SO$_3$H, and in the above definitions, each R independently represents H or an alkyl group which may be substituted, each R$^1$ independently represents H or an alkyl or aryl group which may be substituted, and each R$^2$ independently represents H, an alkyl group which may be substituted, or an aryl group which, if substituted, carries a SO$_3$H or CO$_2$H group attached to a carbon atom of the aromatic ring.

Within the above definitions, R will in general preferably represent a hydrogen atom. When R, R$^1$ or R$^2$ represents an alkyl group, this will preferably be an alkyl group of 1 to 4 carbon atoms, and more especially a methyl group. When R, R$^1$ or R$^2$ represents a substituted alkyl group, this will in general preferably be sulphomethyl or an alkyl group of 2 to 4 carbon atoms substituted by OH, Cl or OSO$_3$H, e.g., β-hydroxyethyl, β-chloroethyl and β-sulphateethyl.

When R$^1$ or R$^2$ represents an aryl group, this will preferably be an aryl radical of the benzene series, e.g., phenyl, tolyl or xylyl. When R$^2$ represents a substituted aryl group, it must contain a SO$_3$H or CO$_2$H group attached to a carbon atom of the aromatic ring, e.g., $o-$, $m-$ or $p-$ sulphophenyl, o-carboxyphenyl, 4- or 5 -sulpho-o-tolyl, 2,4-, 2,5- or 3,5-disulphophenyl, 4- or 5-sulpho-o-carboxyphenyl, 1-sulpho-naphth-2,yl, 4,8- or 6,8-disulphonaphth-2-yl, or 3,6,8-trisulphonaphth-1-yl.

When R$^1$ represents a substituted aryl group, it may represent any of the examples enumerated for R$^2$; other examples are chlorophenyl, methoxyphenyl and acetylaminophenyl.

As examples of organic linking groups represented by Q, there may be mentioned aliphatic, e.g., alkylene groups in which the carbon chain may be interrupted by hetero atoms, cycloaliphatic, araliphatic or aromatic linking groups, which in the case of cyclic groups may

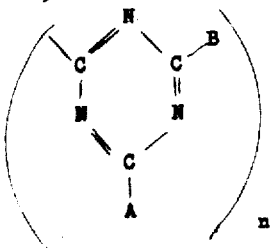

be homocyclic or heterocyclic, e.g., ethylene, propylene, β-ethyleneaminoethylene, 1,4-cyclohexylene, 1,3- or 1,4-phenylene, 4-sulpho-1,3-phenylene,3-sulpho-1,4-phenylene, 4,6-disulpho-1,3-phenylene, and piperazinylene,4,8-disulpho-2,6-naphthylene, methylethylene and 2-hydroxy and 2-sulphatepropylene.

A preferred class of the new dyestuffs are those represented by formula 1, wherein ($v + w$) has a value of 2.0 to 2.5, R is H, n has a value of 1 to 2, one of A and B represents Cl or Br and the other represents a substituent selected from the class consisting of Cl, Br, lower alkoxy, sulphophenoxy, NR$^1$R$^2$ wherein R$^1$ is H, CH$_3$ or CH$_2$SO$_3$H and R$^2$ is H, phenyl, sulphophenyl, disulphophenyl, sulphotolyl, carboxyphenyl, sulphocarboxyphenyl, sulphonaphthyl, disulphonaphthyl, trisulphonaphthyl or

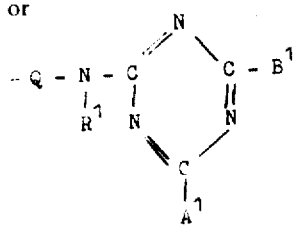

wherein R¹ has the above meaning, Q is ethylene, sulphophenylene, disulphophenylene, sulphotolylene or disulphodiphenylene, A¹ is Cl, SO₃H, sulphoanilino or disulphoanilino and B¹ is selected from Cl, lower alkoxy, sulphophenoxy and —NR¹R³ wherein R¹ has the above meaning and R³ is H, phenyl, sulphophenyl, disulphophenyl, sulphotolyl, carboxyphenyl, sulphocarboxyphenyl, sulphonaphthyl, disulphonaphthyl and trisulphonaphthyl.

Above all are preferred the dyestuffs represented by the formula:

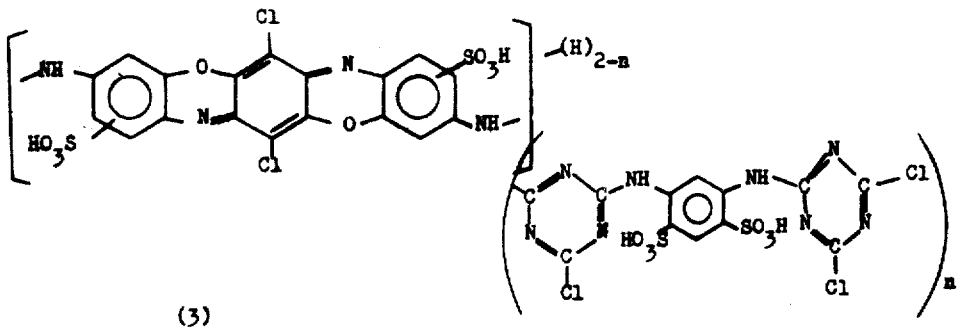

(3)

wherein $n$ has a value of from 1.0 to 1.3.

Manufacture of the New Dyestuffs

A further aspect of the invention is to provide a number of methods for manufacture of the new dyestuffs according to the nature of the substituents A and B.

Thus, a. the dyes of formula (1) in which A and B both represent Cl or Br can be obtained by reacting a diamino compound of the formula:

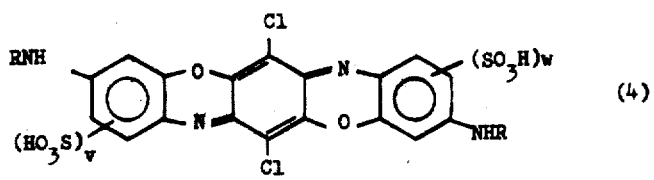

wherein $v$, $w$ and R have the meanings stated above, with 1 to 2 moles of cyanuric chloride or cyanuric bromide.

b. The dyestuffs of formula (1) in which B represents Cl or Br and A represents an alkoxy group can be obtained by reacting a diamino compound of formula (4) with 1 to 2 moles of a triazine of the formula:

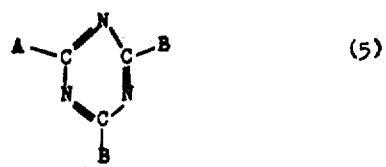

wherein A and B have the meanings just stated.

As examples of triazines of formula 5, there may be mentioned 2,4-dichloro-6-methoxy-s-triazine, 2,4-dibromo-6-methoxy-s-triazine and 2,4-dichloro-6-methoxypropoxy-s-triazine.

c. The dyestuffs of formula (1) in which B represents Cl or Br and A represents a group of the formula NRR² or an aryloxy or arylthio group which may be substituted, can be obtained by reacting cyanuric chloride or bromide in either order with one-half to one mole of a compound of formula (4) and with one mole of the compound of the formula NHRR² or the alkali metal salt of a phenol or thiophenol. As examples of these, there may be mentioned aniline-2,3- and 4-sulphonic acids, aniline-2,4-, 2,5- and 3,5-disulphonic acids, anthranilic acid, 2-methylaniline-4- and 5-sulphonic acids, sodium phenate, sodium thiophenate and sodium 4-sulphophenate.

d. The dyestuffs of formula (1) in which B represents Cl or Br and A represents a SO₃H group can be obtained by reacting a dyestuff of formula (1) in which A and B are both chlorine or bromine with an alkali metal salt of sulphonic acid; especially sodium or potassium sulphite or sodium or potassium bisulphite.

The dyestuffs of formula (1) in which B represents a group of formula (2) can be obtained by the following methods:

e. by reacting a diamino compound of formula (4) with one to two moles of a bis-triazine compound of the formula:

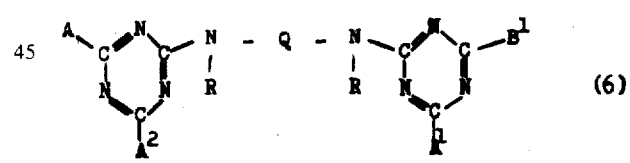

(6)

wherein A² represents Cl or Br and A, A¹, B¹, R and Q have the meanings previously stated.

f. by reacting a compound of formula (1) wherein B stands for Cl or Br and the other symbols have the meanings stated in connection with formula (1), with $n$ moles of a compound of the formula:

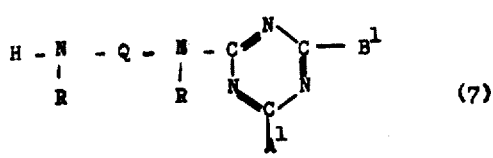

(7)

g. by reacting a compound of the formula:

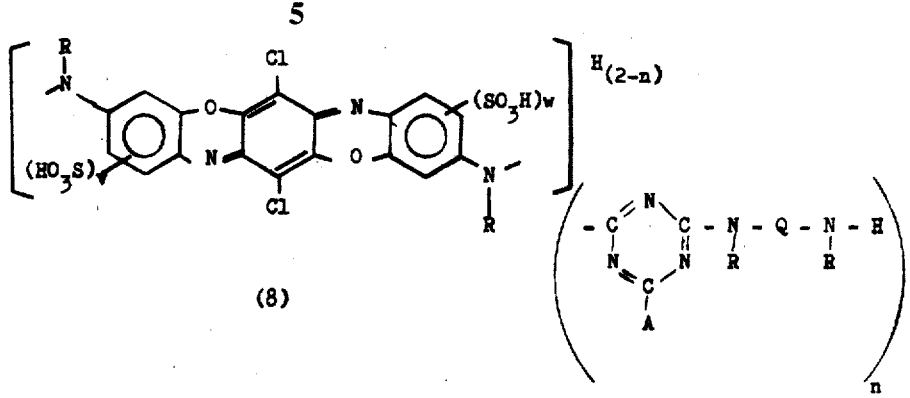

wherein the symbols R, v, w, A, R, Q and n have the meanings already stated, with n moles of a triazine of the formula:

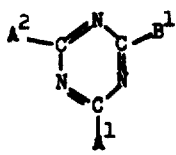

wherein $A^1$, $A^2$ and $B^1$ have the meanings stated above.

h. In the cases where $A^1$ represents Cl or Br and $B^1$ represents $NRR^1$, by reacting a dyestuff of formula (1) in which both $A^1$ and $B^1$ represent Cl or Br with n moles of a compound of formula $NHRR^1$.

i. In the cases where $A^1$ represents $SO_3H$ and $B^1$ represents $OR^1$, $NRR^1$ or $-SR^1$ by reacting a dyestuff of formula (1) in which $B^1$ have the meanings just stated and $A^1$ represents Cl or Br with an alkali metal salt of sulphurous acid.

The compounds of formula (6) can be obtained by reacting a diamine of the formula:

with one mole of a triazine of formula (9) and one mole of a triazine of the formula:

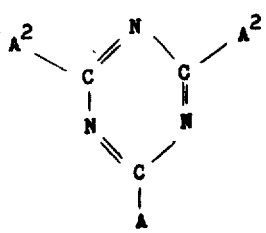

wherein A and $A^2$ have the meanings already stated.

As examples of compounds of formula (10) there may be mentioned 1,4-diaminobenzene-2,5-disulphonic acid, 1,3-diaminobenzene-4,6-disulphonic acid, 1,2-diaminoethane, 2,4-diaminobenzenesulphonic acid, 2,5-diaminobenzene-sulphonic acid, 2,6-diamino-naphthalene-4,8-disulphonic acid, 1,3- and 1,4-diaminobenzene, diaminocyclohexane.

The above processes, whether for manufacture of a dyestuff or an intermediate compound each involves reaction of a halogenated triazine compound with ammonia, an amine, a hydroxyl or thiol compound or an alkali metal salt of sulphurous acid and can be carried out under the general reaction conditions conventional in the art for these reactions. That is to say, in general the reaction can be carried out conveniently in an aqueous medium, in the case of amines in the presence of an acid-binding agent and in the case of hydroxyl or thiol compounds in the presence of sufficient alkali to form the alkali metal salt. The temperature of reaction will depend in general on the number of halogen atoms in the triazine nucleus, cyanuric chloride or bromide reacting at 0°–25°C, a dichloro- or dibromo triazine compound reacting at 30°–60°C and a monochloro- or monobromo-s-triazine compound reacting at 65°–100°C.

The amino groups present in the compound of formula (4) are relatively inert and react slowly with the halogeno-s-triazine in the above processes. Accordingly, the extent to which the amino groups react can conveniently be controlled in practice by the duration of reaction. It has been found that the colour of the dyestuff can conveniently be controlled in this way, a progressively redder shade being obtained as the length of reaction takes place. Thus, in one set of experiments it was found that reaction for 6 hours gave a dyestuff providing bright reddish-blue shades whilst reaction for 10 hours gave a redder dyestuff and for 24 hours gave an even redder dyestuff, the shade being more truly described as a bright bluish violet.

The compounds of formula (4) can be obtained by heating a compound of the formula:

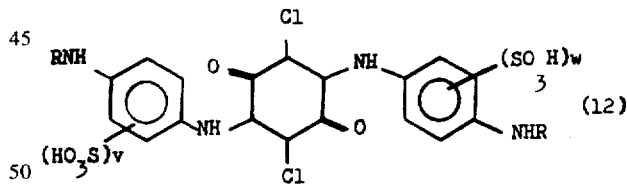

in oleum to effect ring closure. It has previously been proposed in U.K. Specification No. 457,555 to manufacture the compounds of formula (4) by such a method and this specification discloses the use of a temperature of 95°C using 10 percent oleum as the medium. Such conditions provide mixtures of bluish violet compounds, which can be used as described above for manufacture of the new dyes. However, it has been found that by using oleum containing at least 20 percent by weight of free $SO_3$, ring closure can be effected at a lower temperature and the product obtained is a mixture providing dyestuffs of a much purer blue in shade. Accordingly the use of a mixture of diamine compounds of formula (4), obtained in this manner, and especially of a mixture of compounds of the formula:

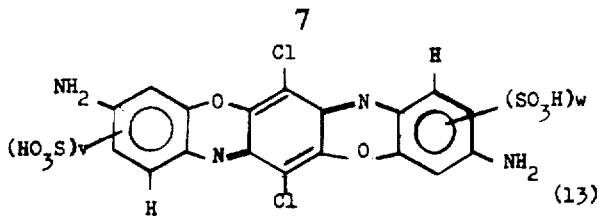

(13)

wherein the value of (v + w) lies between 2.0 and 2.5 is preferred.

The new dyestuffs can be isolated from the medium in which they have been prepared by conventional methods used for isolation of water-soluble reactive dyestuffs, e.g., by salting out followed by filtration and drying or by spray drying the reaction mixture. If desired stabilisers, e.g, alkali hydrogen phosphates or diluents, e.g., sodium chloride or urea may be added.

The new dyestuffs may be used as reactive dyestuffs for cellulose textile materials which they colour in bright blue or bluish-violet shades of excellent fastness to washing and to light when applied in conjunction with acid-binding agents. The preferred dyestuffs represented by formula (3) above are especially distinguished by a combination of high light fastness and sufficient substantivity to give excellent fixation when applied by dyeing whilst retaining excellent freedom from staining during washing tests.

The invention may be illustrated by the following Examples in which parts are by weight and the expression w/v is in the ratio of grams per cc.

EXAMPLE 1

6.63 parts of 2,9-diamino-6,13-dichlorotriphendioxazine containing 2.34 potassium sulphonate groups per molecule, obtained as described below, are dissolved in 500 parts of water and the solution is added to a suspension of 7.36 parts of cyanuric chloride in a mixture of 70 parts of acetone and 250 parts of water at 0°–5°C. The pH is maintained at 4.5–5.0 throughout and stirring is continued under these conditions for 6 hours. The resultant solution is screened and the product is precipitated by the addition of 20 percent (w/v) sodium chloride. The dyestuff is filtered off and dried at room temperature. It dyes cellulose textile materials in bright reddish-blue shades.

The 2,9-diamino-6,13-dichlorotriphendioxazine used in the above example was obtained as follows:

210 Parts of the sodium salt of 1,4-diaminobenzene-2-sulphonic acid are dissolved in 3,000 parts of water and an ethanolic slurry of 123 parts of 2,3,5,6-tetrachloro-1,4-benzoquinone is added. The mixture is stirred at 60°C for 4 hours, the pH being maintained at 6–7 throughout by the addition of 2N sodium hydroxide solution. 600 parts of salt are added to the cooled solution and the product is filtered off and washed with 20 percent brine and then dried at 80°C to give a brown solid.

50 Parts of the above dianilide are stirred with 500 parts of 20 percent oleum at 80°C for 40 minutes, then added to 5,000 parts of ice-water. The product is filtered off, washed with saturated brine and dried at 80°C to give a crude cyclisation product.

50 Parts of the crude cyclisation product are stirred with 5,000 parts of 0.5N potassium hydroxide solution for 48 hours when a red crystalline product forms and the supernatant liquor which was originally red is pale straw coloured. The product is filtered off, washed with 10 percent potassium acetate solution then ethanol and finally dried at 80°C to give a crystalline red solid which dissolves in water to give a bright blue solution.

On subjecting the purified product to elemental analysis there are found C, 30.5; H, 2.0; N, 7.2; S, 10.0; Cl, 9.5%. A compound of the formula:

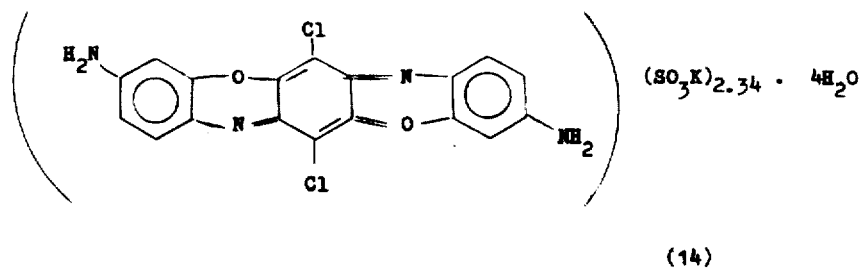

(14)

requires C, 29.5; H, 2.1; N, 7.6; S, 10.2; Cl, 9.7%.

EXAMPLE 2

If the cyanuric chloride used in Example 1 is replaced by 12.7 parts of cyanuric bromide, a similar product is obtained.

EXAMPLE 3

If the cyanuric chloride used in Example 1 is replaced by 6.6 parts of 2-methoxy-4,6-dichloro-s-triazine and reaction is carried out at a temperature of 40°C for 5 hours, a similar product is obtained.

EXAMPLE 4

If the cyanuric chloride used in Example 1 is replaced by 10.1 parts of 2-methoxy-4,6-dibromo-s-triazine and reaction is carried out at a temperature of 40°C for 5 hours, a similar product is obtained.

EXAMPLE 5

A neutral solution of 3.46 parts of metanilic acid in 100 parts of water is added to a suspension of 4.0 parts of cyanuric chloride in a mixture of 40 parts of acetone and 160 parts of water at 0°–5°C. The pH is maintained at 5.5–6.5 throughout by the addition of 2N sodium hydroxide and stirring is continued under these conditions for 1 hour. The solution is screened and 6.63 parts of 2,9-diamino-6,13-dichlorotriphendioxazine containing 2.34 potassium sulphonate groups per molecule purified as described in Example 1 is added. After stirring at pH 5.5–6.5 and 55°C for 10 hours the reaction mixture is cooled to 20°C and sodium chloride added to 30 percent (w/v). The product is filtered off and washed with 30 percent brine then dried at room temperature. The dyestuff obtained dyes cellulosic textile materials in bright reddish-blue shades.

EXAMPLE 6

If the crude cyclisation product described in Example 1 is used in Example 5 in place of the purified diaminodichlorotriphendioxazine a slightly duller dyestuff is obtained.

The following table describes further Examples of dyestuffs obtained from either the crude or the purified diamino dichlorotriphendioxazine polysulphonic acid of Example 1, in a manner similar to Example 5 by reacting with the condensation product of 1 mole of cyanuric chloride and 1 mole of an amine, phenol or ammonia. In the table, column 2 denotes whether the crude or purified form was used, column 3 denotes the compound reacted with cyanuric chloride, and column 4 the time of reaction. The final column gives the shade of the dyestuff obtained.

of the mixed phosphate buffer mentioned above. The cake is dissolved in 400 parts of water, containing 1 percent (w/v) of the mixed phosphate buffer, and screened, then treated with 80 parts of potassium chloride. The white precipitate is filtered off and washed with 30 percent (w/v) potassium chloride containing 1 percent (w/v) of the mixed phosphate buffer and finally dried at room temperature to give a white solid which analysed for the following atomic ratio $C_{12.0}$ $N_{8.1}$ $S_{2.0}$ corresponding to the structure:

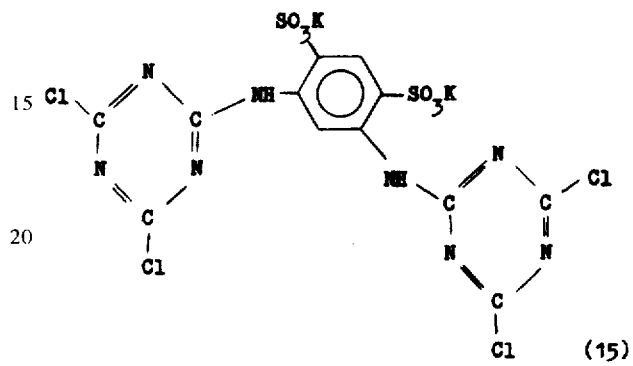

(15)

| Example | Triphendioxazine | Condensation product of cyanuric chloride (1 mole) and: | Time of reaction (hr.) | Colour |
| --- | --- | --- | --- | --- |
| 7 | Purified | ammonia | 15 | bright reddish blue |
| 8 | do. | p-sulphophenol | 15 | do. |
| 9 | do. | N-methylaniline-3-sulphonic acid | 15 | do. |
| 10 | do. | sulphanilic acid | 15 | do. |
| 11 | do. | 2-methylamino-5-sulphobenzoic acid | 15 | do. |
| 12 | Crude | do. | 15 | do. |
| 13 | Purified | orthanilic acid | 15 | do. |
| 14 | do. | 2-aminonaphthalene-6-sulphonic acid | 15 | do. |
| 15 | do. | 2-aminonaphthalene-5,7-disulphonic acid | 15 | do. |
| 16 | do. | 1-naphthylamine-3,6,8-trisulphonic acid | 6 | do. |
| 17 | do. | Sulphomethylamine | 10 | do. |
| 18 | do. | N-sulphomethylaniline | 6 | do. |
| 19 | do. | ethanol | 6 | do. |
| 20 | do. | 2-methylaniline-5-sulphonic acid | 6 | do. |
| 21 | Crude | isopropanol | 6 | do. |

EXAMPLE 22

8.10 parts of 2,9-diamino-6,13-dichlorotriphendioxazine having 2.34 potassium sulphonate substituents and 1.2 N-dichloro-s-triazinyl amino substituents per molecule, obtained as described in Example 1, are stirred at 25°C for 16 hours with 1.3 parts of sodium sulphite and 800 parts of water. The product, which is precipitated by the addition of salt, dyes cellulosic textile materials in bright reddish-blue shades having good fastness to light and washing.

EXAMPLE 23

3.12 parts of 1,3-diaminobenzene-4,6-disulphonic acid disodium salt are dissolved in 100 parts of water and added to a suspension of 7.36 parts of cyanuric chloride in a mixture of 70 parts of acetone and 250 parts of water at 0°–5°C. The pH is maintained at 4.5–5.0 by the addition of 2N potassium hydroxide and stirring under these conditions is maintained for 24 hours. The pH is adjusted to 2.5 with 2N hydrochloric acid and the reaction mixture stirred at 8°–10°C for 4 hours. The pH is then adjusted to 6.0 by the addition of 2N potassium hydroxide. 4.0 parts of a mixture consisting of 2 parts of potassium dihydrogen phosphate and 1 part of disodium hydrogen phosphate is added followed by 120 parts of potassium chloride. The white precipitate is filtered off and washed with 30 percent (w/v) potassium chloride containing 1 percent (w/v)

25.6 Parts of this 1,3-N:N-bis-dichlorotriazinylaminobenzene-4,6-disulphonic acid dipotassium salt, 10.0 parts of the mixed phosphate buffer and 6.63 parts of 2,9-diamino-6,13-dichlorotriphendioxazine containing 2.34 potassium sulphonate groups per molecule, obtained and purified as described in Example 1, are dissolved in 2,000 parts of water and stirred at 50° ± 2°C for 3 hours then cooled to room temperature and treated with 600 parts of potassium chloride. The precipitate is filtered off and washed with 30 percent (w/v) potassium chloride containing 1 percent mixed phosphate buffer and finally dried at room temperature. The dyestuff obtained dyes cellulosic textile materials in bright reddish blue shades of good fastness to light and wet treatment.

A slightly greener and brighter dye is obtained by reacting for only 1¾ hours at 50°C.

EXAMPLE 24

If in place of the purified 2,9-diamino-6,13-dichlorotriphendioxazine used in Example 23 there is used the crude cyclisation product described in Example 1, the dyestuff obtained dyes cellulosic textile materials in bright-reddish blue shades which are slightly duller than those obtained from the dyestuff of Example 23.

EXAMPLE 25

3.12 Parts of 1,3-diaminobenzene-4,6-disulphonic acid disodium salt are dissolved in 100 parts of water and added to a suspension of 2.0 parts of cyanuric chloride in a mixture of 20 parts of acetone and 80 parts of water at 0°–5°C. The pH is maintained at 5.5–6.5 by the addition of 2N sodium hydroxide and stirring is continued under these conditions for 1 hour. The solution is screened then added to a neutral solution of 1.73 parts of metanilic acid. The mixture is stirred at pH 5.5–6.5 and 50°C for 4 hours then added to a suspension of 4.0 parts of cyanuric chloride in a mixture of 40 parts of acetone and 160 parts of water at 0°–5°C and pH 4.5–5.0. Stirring is continued under these conditions for 24 hours. The pH is then adjusted to 2.5 with 2N hydrochloric acid and stirring continued for 4 hours. The pH is then adjusted to 6.0 with 2N sodium hydroxide and sodium chloride is added to 10 percent w/v. The product of formula hours. 50 Parts of sodium chloride and 25 parts of potassium chloride are added and the product is filtered off and dried at room temperature. The dyestuff obtained dyes cellulosic textile materials in bright reddish blue shades of good fastness to light and wet treatment.

EXAMPLE 26

If the crude cyclisation product described in Example 1 is used in Example 25 instead of the purified diamino-dichlorotriphendioxazine, a slightly duller dyestuff is obtained.

The following table describes further Examples of dyestuffs obtained from either the crude or the purified diamino-dichlorotriphendioxazine polysulphonic acid of Example 1 in a manner similar to Example 23 or Example 25. In the table, column 2 denotes whether the

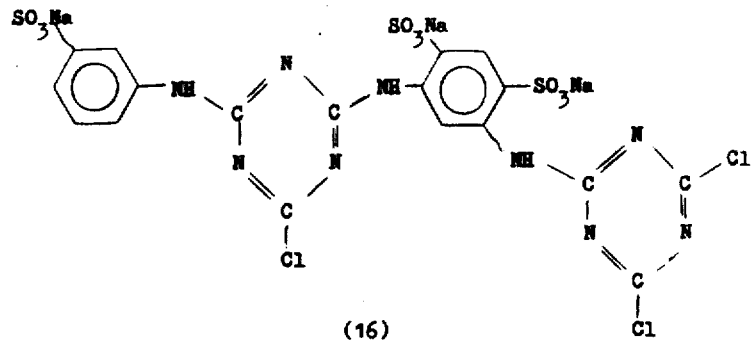

(16)

is filtered off.

This product is dissolved together with 3.3 parts of 2,9-diamino-6,13-dichlorotriphendioxazine containing 2.34 potassium sulphonate groups per molecule, purified as described in Example 1, in 250 parts of water and the solution is stirred at 60° and pH 5.5–6.5 for 10 crude or purified form was used, column 3 denotes the diamine reacted with cyanuric chloride, column 4 the other compound, if any, and column 5 the time of reaction. The final column gives the shade of the dyestuff obtained. The proportion of diamine and other compound to cyanuric chloride is 0.5 mole in each case.

| Example | Triphen-dioxazine | Condensation product of cyanuric chloride (1 mole) and: | Amine or Phenol | Time of Reaction (hr.) | Colour |
|---|---|---|---|---|---|
| 27 | Purified | p-phenylenediamine sulphonic acid | | 6 | bright reddish-blue |
| 28 | do. | m-phenylenediamine sulphonic acid | | 6 | do. |
| 29 | do. | 1,3-phenylenediamine-4,6-disulphonic acid | | 10 | bright, very reddish-blue |
| 30 | do. | do. | | 24 | bright bluish-violet |
| 31 | do. | 1,4-phenylenediamine-2,5-disulphonic acid | | 6 | bright reddish-blue |
| 32 | do. | N,N'-bis(sulphomethyl) ethylenediamine | | 10 | do. |
| 33 | do. | N,N'-bis(sulphomethyl)-p-phenylenediamine | | 10 | do. |
| 34 | Crude | 1,3-phenylenediamine-4,6-disulphonic acid | | 1¾ | do. |
| 35 | do. | do. | N-methylaniline-3-sulphonic acid | 15 | do. |
| 36 | Purified | do. | do. | 15 | do. |
| 37 | Purified | 1,3-phenylenediamine-4,6-disulphonic acid | N,N'-bis(sulphomethyl)-p-phenylenediamine | 15 | bright reddish-blue |
| 38 | do. | do. | 2-methylamino-5-sulphobenzoic acid | 15 | do. |
| 39 | do. | do. | p-sulphophenol | 15 | do. |
| 40 | do. | do. | aniline-2,5-disulphonic acid | 10 | do. |
| 41 | do. | do. | aniline-3,5-disulphonic acid | 10 | do. |
| 42 | do. | do. | orthanilic acid | 10 | do. |
| 43 | do. | do. | 1-aminonaphthalene-3,6-disulphonic acid | 15 | do. |
| 44 | do. | do. | 1-naphthylamine-3,6,8-trisulphonic acid | 10 | do. |

—CONTINUED

| Example | Triphen-dioxazine | Condensation product of cyanuric chloride (1 mole) and: | Amine or Phenol | Time of Reaction (hr.) | Colour |
|---|---|---|---|---|---|
| 45 | do. | do. | sulphanilic acid | 10 | do. |
| 46 | do. | m-phenylenediamine | aniline-2,5-disulphonic acid | 10 | do. |
| 47 | Crude | do. | do. | 10 | do. |
| 48 | Purified | m-phenylenediamine | aniline-3,5-disulphonic acid | 10 | bright reddish-blue |
| 49 | do. | do. | metanilic acid | 10 | |
| 50 | Crude | ethylene diamine | do. | 10 | do. |
| 51 | Purified | do. | | 10 | do. |
| 52 | do. | do. | aniline-2,5-disulphonic acid | 10 | do. |
| 53 | do. | m-phenylenediamine sulphonic acid | do. | 6 | do. |
| 54 | do. | do. | metanilic acid | 8 | do. |
| 55 | do. | do. | orthanilic acid | 8 | do. |
| 56 | do. | do. | sulphanilic acid | 8 | do. |
| 57 | do. | do. | N-methyl metanilic acid | 8 | do. |
| 58 | do. | do. | 1-naphthylamine-3,6,8-trisulphonic acid | 6 | do. |
| 59 | do. | do. | N-methyl-5-sulpho anthranilic acid | 8 | do. |
| 60 | Purified | m-phenylenediamine sulphonic acid | aniline-3,5-disulphonic acid | 6 | bright reddish-blue |
| 61 | do. | p-phenylenediamine sulphonic acid | do. | 10 | do. |
| 62 | do. | do. | aniline-2,5-disulphonic acid | 10 | do. |
| 63 | do. | do. | metanilic acid | 10 | do. |
| 64 | do. | do. | orthanilic acid | 10 | do. |
| 65 | do. | do. | sulphanilic acid | 10 | do. |
| 66 | do. | do. | 1-naphthylamine-3,6,8-trisulphonic acid | 10 | do. |
| 67 | do. | p-phenylenediamine | do. | 15 | do. |
| 68 | do. | do. | aniline-3,5-disulphonic acid | 15 | do. |
| 69 | do. | do. | aniline-2,5-disulphonic acid | 15 | do. |
| 70 | do. | do. | metanilic acid | 15 | do. |
| 71 | Purified | p-phenylenediamine | orthanilic acid | 15 | bright reddish-blue |
| 72 | do. | do. | sulphanilic acid | 15 | do. |
| 73 | do. | 4-methylaminoaniline-3-sulphonic acid | do. | 10 | do. |
| 74 | do. | do. | 1-naphthylamine-3,6,8-trisulphonic acid | 10 | do. |
| 75 | do. | do. | aniline-3,5-disulphonic acid | 10 | do. |
| 76 | do. | do. | aniline-2,5-disulphonic acid | 10 | do. |
| 77 | do. | do. | metanilic acid | 10 | do. |
| 78 | do. | do. | orthanilic acid | 10 | do. |
| 79 | do. | do. | N-methyl-5-sulpho anthranilic acid | 10 | do. |
| 80 | do. | 1,4-phenylenediamine-2,5-disulphonic acid | aniline | 6 | do. |
| 81 | Purified | 1,4-phenylenediamine-2,5-disulphonic acid | metanilic acid | 3 | bright reddish-blue |
| 82 | do. | do. | orthanilic acid | 24 | bright bluish-violet |
| 83 | do. | do. | sulphanilic acid | 4 | bright reddish-blue |
| 84 | do. | do. | aniline-2,5-disulphonic acid | 2 | do. |
| 85 | do. | do. | aniline-3,5-disulphonic acid | 2 | do. |
| 86 | do. | do. | 1-naphthylamine-3,6,8-trisulphonic acid | 2 | do |
| 87 | do. | 4,4'-diaminodiphenyl-2,2'-disulphonic acid | | 10 | do. |
| 88 | do. | do. | metanilic acid | 10 | do. |
| 89 | do. | 2,4-diaminotoluene | aniline-2,5-disulphonic acid | 15 | do. |
| 90 | Purified | 5-sulpho-2,4-diaminotoluene | aniline | 10 | bright reddish-blue |
| 91 | do. | do. | orthanilic acid | 10 | do. |
| 92 | do. | 2,5-diaminotoluene | aniline-3,5-disulphonic acid | 15 | do. |
| 93 | do. | do. | 1-naphthylamine-3,6,8-trisulphonic acid | 15 | do. |

EXAMPLE 94

3.12 parts of 1,3-diaminobenzene-4,6-disulphonic acid disodium salt are reacted with 2.0 parts of cyanuric chloride then 1.73 parts of metanilic acid as described in Example 25, 1.3 parts of sodium sulphite are added and stirring is maintained at 40°C for 16 hours. 4.0 parts of cyanuric chloride are added at 0°–5°C and stirring is continued at 0°–5°C for 20 hours. The pH is maintained at 6.0–6.5 throughout by the addition of 2N sodium hydroxide. Purification as described in Example 25 gives the compound of formula

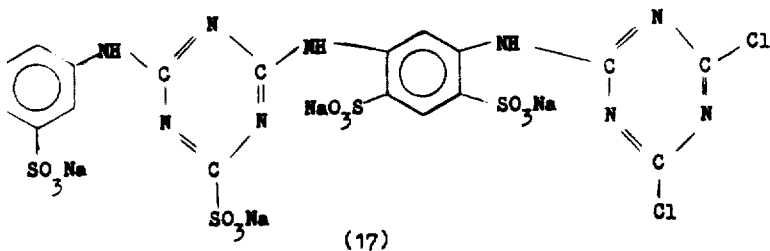

(17)

which is reacted with 3.3 parts of 2,9-diamino-6,13-dichlorotriphendioxazine containing 2.34 potassium sulphonate groups per molecule as described in Example 25. The dyestuff obtained dyes cellulosic textile materials in bright reddish-blue shades of good fastness to light and washing treatments.

EXAMPLE 95

3.12 parts of 1,3-diamino-4,6-disulphonic acid disodium salt are dissolved in 100 parts of water and added to a suspension of 2.0 parts of cyanuric chloride in a mixture of 20 parts of acetone and 80 parts of water at 0°–5°C. The pH is maintained at 5.5–6.5 by the addition of 2N sodium hydroxide and stirring is continued under these conditions for 1 hour. The resultant solution is filtered then added to a neutral solution of 3.5 parts of metanilic acid in 100 parts of water. The mixture is then stirred at pH 5.5–6.5 and 90°C for 6 hours then added to a suspension of 4.0 parts of cyanuric chloride in a mixture of 40 parts of acetone and 160 parts of water at 0°–5°C and pH 4.5–5.0. Stirring is continued under these conditions for 24 hours. Sodium chloride is added to 25 percent w/v and the product of formula

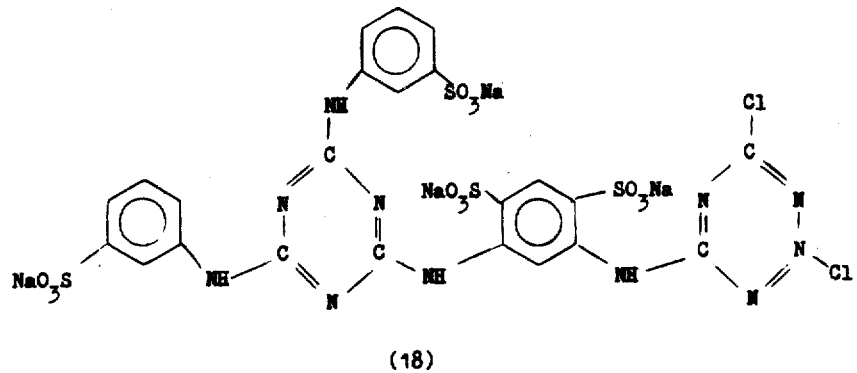

(18)

is filtered off.

This product is dissolved together with 3.3 parts of 2,9-diamino-6,13-dichlorotriphendioxazine containing 2.34 potassium sulphonate groups per molecule, purified as described in Example 1, in 250 parts of water and the solution is stirred at 60°C and pH 5.5–6.5 for 10 hours. 50 parts of sodium chloride and 25 parts of potassium chloride are added and the product is filtered off and dried at room temperature. The dyestuff obtained dyes cellulosic textile materials in bright reddish-blue shades of good fastness to light and wet treatments.

The following table describes a number of other dyestuffs of the invention obtained in a similar manner to Example 95. The diamine of column 2 and the amine or amines of columns 3 and 4 are reacted with cyanuric chloride and the resulting tertiary condensation product which contains a free amino group is reacted with one mole of cyanuric chloride; the resulting product is reacted with the diamino-dichlorotriphendioxazine polysulphonic acid of Example 1 for from 2 to 24 hours to give bright reddish-blue to bright bluish-violet dyestuffs, depending on the time of reaction.

| Example | Diamine | Amine (A'H) | AMINE (B'H) |
|---|---|---|---|
| 96 | 1,3-phenylenediamine-4,6-disulphonic acid | metanilic acid | sulphanilic acid |
| 97 | do. | metanilic acid | aniline |
| 98 | do. | sulphanilic acid | do. |
| 99 | do. | do. | sulphanilic acid |
| 100 | 1,4-phenylenediamine-2,5-disulphonic acid | metanilic acid | metanilic acid |
| 101 | do. | do. | orthanilic acid |
| 102 | do. | aniline | sulphanilic acid |
| 103 | do. | do. | aniline-2,5-disulphonic acid |
| 104 | do. | sulphanilic acid | aniline-3,5-disulphonic acid |
| 105 | do. | do. | 1-naphthylamine-3,6,8-trisulphonic acid |

EXAMPLE 106

6.63 parts of 2,9-diamino-6,13-dichlorotriphendioxazine containing 2.34 potassium sulphonate groups per molecule is reacted with 7.86 parts of cyanuric chloride as described in Example 1 and filtered.

2.6 parts of metanilic acid are dissolved at pH 7.0 in 50 parts of water and added to a suspension of 3 parts of cyanuric chloride in 30 parts of acetone and 120 parts of water whilst maintaining the pH at 5–6 by the addition of 1N sodium hydroxide. Stirring is continued under these conditions for 30 minutes, then the solution is filtered and added to a neutral solution of 4.02 parts of 1,3-diaminobenzene-4-sulphonic acid. The mixture is stirred at 40°C for 4 hours whilst maintaining the pH at 3.5–4.0 by the addition of 1N sodium hydroxide. Salt is added to 25 percent w/v and the precipitate is filtered off and washed with 25 percent brine. The cake is added to the solution of paragraph 1 and the mixture is stirred at 40°C for 4 hours at pH 5–6. The product is precipitated by the addition of salt to 20 percent w/v, filtered off and dried at room temperature.

The product dyes cellulose textile materials in bright reddish-blue shades.

EXAMPLE 107

2.3 parts of 1,3-diaminobenzene-4-sulphonic acid and 2.1 parts of metanilic acid are reacted with 2.2 parts of cyanuric chloride under the conditions described in Example 106. 1.6 parts of sodium sulphite are added and the solution is stirred at 40°C for 16 hours. The resultant solution is mixed with a solution of the product from Example 1 and the mixture is stirred at 40°C and pH 6.0–6.5 for 4 hours. Salt is added to 30 percent (w/v) and the product is filtered off and dried at room temperature. The dyestuff so obtained dyes cellulosic fibres in bright reddish-blue shades of good fastness to light and washing treatments.

The following table describes further examples of dyestuffs of the invention obtained in a similar manner to Example 106. The amine of column 3 and the diamine of column 2 are reacted with cyanuric chloride and the resultant product is reacted with the product of Example 1. The dyes obtained colour cellulose in bright reddish-blue shades.

ride as described in Example 1. The resultant mixture is filtered, added to a neutral solution of 5.6 parts of 1,-3-diaminobenzene-4-sulphonic acid, then stirred at 40°C for 2 hours whilst maintaining the pH at 4.5–5.0 by the addition of 2N sodium hydroxide. The product is precipitated by the addition of salt to 15 percent (w/v) then filtered off and washed with 15 percent brine.

The paste is dissolved in 250 parts of water and added to a solution of the reaction product of 7.36 parts of cyanuric chloride and 3.6 parts of metanilic acid (obtained by the method described in Example 106) and the mixture is stirred at 40°C for 5 hours. The pH is maintained at 5–6 throughout by the addition of 1N sodium hydroxide. The product is precipitated by the addition of salt to 15 percent w/v then filtered off, washed with 15 percent brine and finally dried at room temperature. The dyestuff dyes cellulosic textile materials in bright reddish-blue shades having good fastness to light and washing treatments.

EXAMPLE 128

7.36 parts of cyanuric chloride are reacted with 6.63 parts of 2,9-diamino-6,13-dichlorotriphendioxazine having 2.34 potassium sulphate substituents per molecule as described in Example 1. 3.2 parts of sodium sulphite dissolved in 50 parts of water are added to the filtered solution and the mixture is stirred at 40°C for 16 hours. The resultant solution is added to a solution of 1.9 parts of 1,3-diaminobenzene-4-sulphonic acid in 100 parts of water at pH 7.0 and the mixture is then stirred at 45°C and pH 4.5–5.0 for 4 hours.

2.4 parts of cyanuric chloride are reacted with 2.0 parts of metanilic acid as described in Example 106, added to the solution of paragraph 1 and the mixture is stirred at 40°C for 4 hours whilst maintaining the pH at 6–7 by the addition of 2N sodium hydroxide.

The product which is precipitated by the addition of salt to 30 percent w/v dyes cellulosic textile materials in bright reddish-blue shades having good fastness to light and washing treatments.

The above product can alternatively be obtained by reacting cyanuric chloride with the triphendioxazine and 1,3-diaminobenzene-4-sulphonic acid as described

| Example | Diamine | Amine |
|---|---|---|
| 108 | 1,3-phenylenediamine-4-sulphonic acid | sulphanilic acid |
| 109 | do. | aniline-2,5-disulphonic acid |
| 110 | do. | aniline-3,5-disulphonic acid |
| 111 | do. | 1-naphthlamine-3,6,8-trisulphonic acid |
| 112 | 1,4-phenylenediamine-2-sulphonic acid | do. |
| 113 | do. | metanilic acid |
| 114 | do. | orthanilic acid |
| 115 | do. | sulphanilic acid |
| 116 | do. | aniline-2,5-disulphonic acid |
| 117 | do. | aniline-3,5-disulphonic acid |
| 118 | 4-methylaminoaniline-3-sulphonic acid | do. |
| 119 | do. | aniline-2,5-disulphonic acid |
| 120 | do. | metanilic acid |
| 121 | do. | sulphanilic acid |
| 122 | do. | 1-naphthylamine-3,6,8-trisulphonic acid |
| 123 | m-phenylenediamine | aniline-2,5-disulphonic acid |
| 124 | do. | aniline-3,5-disulphonic acid |
| 125 | do | 1-naphthylamine-3,6,8,-trisulphonic acid |
| 126 | ethylene diamine | aniline-2,5-disulphonic acid |

EXAMPLE 127

6.63 parts of 2,9-diamino-6,13-dichlorotriphendioxazine containing 2.34 potassium sulphonate groups per molecule are reacted with 7.36 parts of cyanuric chloride in Example 127 followed by reaction with one equivalent of sodium sulphite then proceeding as described in paragraph 2.

The following table describes a number of dyestuffs of the invention made in a similar manner to Example 127 by reacting cyanuric chloride with the diamino-dichlorotriphendioxazine polysulphonic acid of Example 1 and with the diamine of column 2, and reacting the product with cyanuric chloride or the condensation product of cyanuric chloride and the amine of column 3. The dyes all colour cellulose textiles in bright reddish-blue to bright bluish-violet shades depending on the length of reaction between the cyanuric chloride and the diamino-dichlorotriphendioxazine polysulphonic acid.

molecule and dyes cellulosic textile materials in bright reddish-blue shades of good fastness to washing and light treatment.

The following table describes further Examples of dyestuffs obtained either from the crude or purified dichlorotriphendioxazine polysulphonic acid of Example 1, by methods similar to that described in Example 144. Column 2 denotes whether the crude or purified form was used, column 3 the diamine used and column 4 the amine used for reaction in the final stage.

| Example | Diamine | Reaction product of cyanuric chloride and: |
|---|---|---|
| 129 | 1,3-phenylenediamine-4-sulphonic acid | metanilic acid |
| 130 | do. | aniline-3,5-disulphonic acid |
| 131 | do. | 1-naphthylamine-3,6,8-trisulphonic acid |
| 132 | ethylene diamine | |
| 133 | do. | sulphanilic acid |
| 134 | do. | aniline-2,5-disulphonic acid |
| 135 | 1,4-phenylenediamine-2-sulphonic acid | |
| 136 | do. | metanilic acid |
| 137 | do. | aniline-2,5-disulphonic acid |
| 138 | do. | orthanilic acid |
| 139 | 1,3-phenylenediamine-4,6-disulphonic acid | |
| 140 | 1,4-phenylenediamine-2,5-disulphonic acid | |
| 141 | 4-methylaminoaniline-3-sulphonic acid | |
| 142 | do. | metanilic acid |
| 143 | m-phenylenediamine | aniline-2,5-disulphonic acid |

| Example | Triphen-dioxazine | Diamine | End-amine |
|---|---|---|---|
| 145 | Purified | 1,3-diaminobenzene-4-sulphonic acid | 1-aminobenzene-3,5-disulphonic acid |
| 146 | Crude | do. | do. |
| 147 | do. | do. | 1-aminonaphthalene-3,6,8-trisulphonic acid |
| 148 | do. | ethylene diamine | do. |
| 149 | do. | do. | 1-aminobenzene-3,5-disulphonic acid |
| 150 | Purified | do. | do. |
| 151 | do. | 1,3-diaminobenzene | do. |
| 152 | do. | 1,4-diamonobenzene-2-sulphonic acid | do. |
| 153 | do. | do. | 1-aminobenzene-3-sulphonic acid |
| 154 | do. | 1,3-diaminobenzene-4,6-disulphonic acid | ammonia |

EXAMPLE 144

A paste obtained in accordance with paragraph 1 of Example 127 is dissolved in 250 parts of water and added to a suspension of 7.36 parts of cyanuric chloride in a mixture of 70 parts of acetone and 250 parts of water. The mixture is stirred at 20°C for 1 hour, keeping the pH at 8–8.5 by addition of dilute caustic soda. The resultant solution is filtered then added to a neutral solution of 3.6 parts of 1-aminobenzene-3-sulphonic acid in 100 parts of water. The mixture is stirred at 40°C for 2 hours whilst maintaining the pH at 5–6 by the addition of 1N sodium hydroxide. The product is precipitated by the addition of salt to 15 percent then filtered off and dried at room temperature. The dyestuff obtained analyses for 4.3 chlorine atoms per

EXAMPLE 155

To a neutral solution of 3.12 parts of 1,3-diaminobenzene-4,6-disulphonic acid disodium salt in 100 parts of water, there is added a solution of 2,4-dichloro-6-methoxy-s-triazine obtained by reacting 2.0 parts of cyanuric chloride with excess methanol. The mixture is stirred at 30°C, pH 5–6 for 2 hours, then filtered and the filtrate is added to a suspension of 4.0 parts of cyanuric chloride in a mixture of 40 parts of acetone and 160 parts of water at 0°–5°C, pH 4.5–5.0 for 24 hours. The mixture is filtered and the filtrate reacted with 3.3 parts of the 2,9-diamino-6,13-dichlorotriphendioxazine used in Example 1 at 60° and pH 5.5–6.5 for 10 hours.

The product is salted out, filtered off and dried. It dyes cellulose textile materials in bright reddish-blue shades of good fastness to light and washing.

I claim:

1. A dyestuff of the formula:

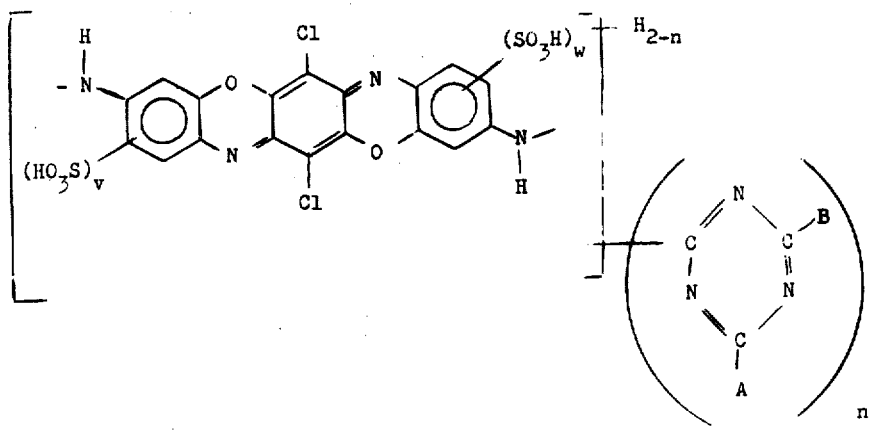

wherein $v + w$ has a value 2.0 to 2.5, $n = 1$ to 2, A is Cl or Br, B is lower alkoxy, sulphophenoxy or $NR^1R^2$ wherein $R^1$ is H, $CH_3$ or $CH_2SO_3H$ and $R^2$ is H, phenyl, sulphophenyl, disulphophenyl, sulphotolyl, carboxyphenyl, sulphocarboxyphenyl, sulphonaphthyl, disulphonaphthyl, trisulphonaphthyl or

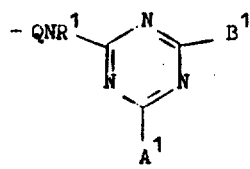

wherein $R^1$ has the meaning given above, Q is sulphophenylene, disulphophenylene, ethylene, disulphodiphenylene or sulphotolylene, $A^1$ is Cl, $SO_3H$, or sulphoanilino or disulphoanilino and $B^1$ is Cl, lower alkoxy, sulphophenoxy or $NR^1R^3$ wherein $R^1$ has the meaning given above and $R^3$ is H, phenyl, sulphophenyl, disulphophenyl, sulphotolyl, carboxyphenyl, sulphocarboxyphenyl, sulphonaphthyl, disulphonaphthyl or trisulphonaphthyl.

2. A dyestuff of claim 1 having the formula:

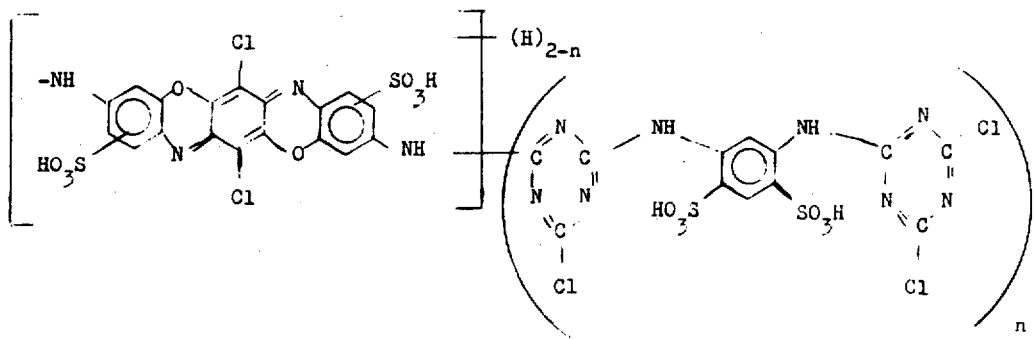

wherein $n$ has a value of from 1.0 to 1.3.

* * * * *